US011025571B2

(12) United States Patent
Jeon et al.

(10) Patent No.: US 11,025,571 B2
(45) Date of Patent: Jun. 1, 2021

(54) MESSAGE SHARING METHOD FOR SHARING IMAGE DATA REFLECTING STATUS OF EACH USER VIA CHAT ROOM AND COMPUTER PROGRAM FOR EXECUTING SAME METHOD

(71) Applicant: Snow Corporation, Seongnam-si (KR)

(72) Inventors: Sang Cheol Jeon, Seongnam-si (KR); Chang Young Jeong, Seongnam-si (KR); Young Hun Kim, Seongnam-si (KR)

(73) Assignee: SNOW CORPORATION, Gyeonggi-Do (KR)

( * ) Notice: Subject to any disclaimer, the term of this patent is extended or adjusted under 35 U.S.C. 154(b) by 42 days.

(21) Appl. No.: 16/283,052

(22) Filed: Feb. 22, 2019

(65) Prior Publication Data

US 2019/0190865 A1 Jun. 20, 2019

Related U.S. Application Data

(63) Continuation of application No. PCT/KR2016/009218, filed on Aug. 22, 2016.

(51) Int. Cl.
*H04L 12/58* (2006.01)
*G06K 9/00* (2006.01)
(Continued)

(52) U.S. Cl.
CPC ............ *H04L 51/10* (2013.01); *G06F 40/109* (2020.01); *G06K 9/00228* (2013.01);
(Continued)

(58) Field of Classification Search
CPC .... H04L 51/10; H04L 51/02; H04M 1/72547; H04N 21/44008; H04N 9/8205;
(Continued)

(56) References Cited

U.S. PATENT DOCUMENTS 6,801,663 B2    10/2004  Matsushita et al.
8,611,724 B2 *  12/2013  Masutani ............. H04N 9/8205
                                                         386/248
(Continued)

FOREIGN PATENT DOCUMENTS

CN     1798324 A      7/2006
CN   103533241 A      1/2014
(Continued)

OTHER PUBLICATIONS

Japanese Office Action dated Feb. 12, 2020 for corresponding Japanese Application No. 2019-510910.
(Continued)

*Primary Examiner* — Kyung H Shin
(74) *Attorney, Agent, or Firm* — Harness, Dickey & Pierce, P.L.C.

(57) ABSTRACT

A message sharing method includes: receiving image data captured via an imaging unit; receiving text input by a user via the input unit; analyzing, by a processor, the text and the image data and extracting a first object related to the user by using at least one of a result of analyzing the text, a result of analyzing the image data, and a sensed value obtained from a sensor unit; editing the image data to further include the extracted first object, and converting the edited image data to a thumbnail format; sharing the converted image data and the text with another user via a chat room.

20 Claims, 10 Drawing Sheets

(51) Int. Cl.
*G06K 9/32* (2006.01)
*G06F 40/109* (2020.01)
*G06F 40/103* (2020.01)
*G06F 40/284* (2020.01)

(52) U.S. Cl.
CPC ....... *G06K 9/00315* (2013.01); *G06K 9/3241* (2013.01); *H04L 51/04* (2013.01); *H04L 51/046* (2013.01); *G06F 40/103* (2020.01); *G06F 40/284* (2020.01)

(58) Field of Classification Search
CPC ............. H04N 5/23219; H04N 5/2354; H04N 21/4307; H04N 21/4394; H04N 5/23218; H04N 5/23212; H04N 5/2352; G06K 9/62; G06Q 30/02; G06Q 30/0251
See application file for complete search history.

(56) References Cited

U.S. PATENT DOCUMENTS

| | | | |
|---|---|---|---|
| 2003/0038884 A1 | 2/2003 | Matsushita et al. | |
| 2006/0204055 A1* | 9/2006 | Steinberg | H04N 5/23218 382/118 |
| 2006/0281064 A1 | 12/2006 | Sato et al. | |
| 2007/0160004 A1 | 7/2007 | Sakhpara | |
| 2009/0028434 A1* | 1/2009 | Vanhoucke | G06Q 30/02 382/182 |
| 2009/0142001 A1 | 6/2009 | Kuniyuki | |
| 2014/0204237 A1 | 7/2014 | Sohn et al. | |
| 2014/0344749 A1* | 11/2014 | Choi | G06F 3/04817 715/780 |
| 2015/0281145 A1 | 10/2015 | Ji | |

FOREIGN PATENT DOCUMENTS

| | | |
|---|---|---|
| JP | 2001-245269 A | 9/2001 |
| JP | 2007-266793 A | 10/2007 |
| JP | 2008-072711 A | 3/2008 |
| JP | 2009-135720 A | 6/2009 |
| JP | 2015-028686 A | 2/2015 |
| JP | 2016-006691 A | 1/2016 |
| KR | 10-2006-0121679 A | 11/2006 |
| KR | 10-0868638 B1 | 11/2008 |
| KR | 10-2009-0129580 A | 12/2009 |
| KR | 10-2014-0132977 A | 11/2014 |

OTHER PUBLICATIONS

PCT Request for PCT International Application PCT/KR2016/009218 filed Aug. 22, 2016.
PCT Change Notification (PCT/IB/306) for PCT International Application PCT/KR2016/009218 filed Aug. 22, 2016.
Written Opinion (PCT/SIA/237) for PCT International Application PCT/KR2016/009218 filed Aug. 22, 2016.
International Search Report (PCT/ISA/210) for PCT International Application PCT/KR2016/009218 filed Aug. 22, 2016.
International Search Report (PCT/ISA/210) for PCT International Application PCT/KR2016/009218 filed Aug. 22, 2016 (Korean).
Chinese Office Action dated Dec. 3, 2020 for corresponding Chinese Application No. 201680088655.6.

* cited by examiner (a)

(b)

(c)

(a)

(b)

(c)

(a)

(b)

(c)

(a)

(b)

(c)

(a)

(b)

(c)

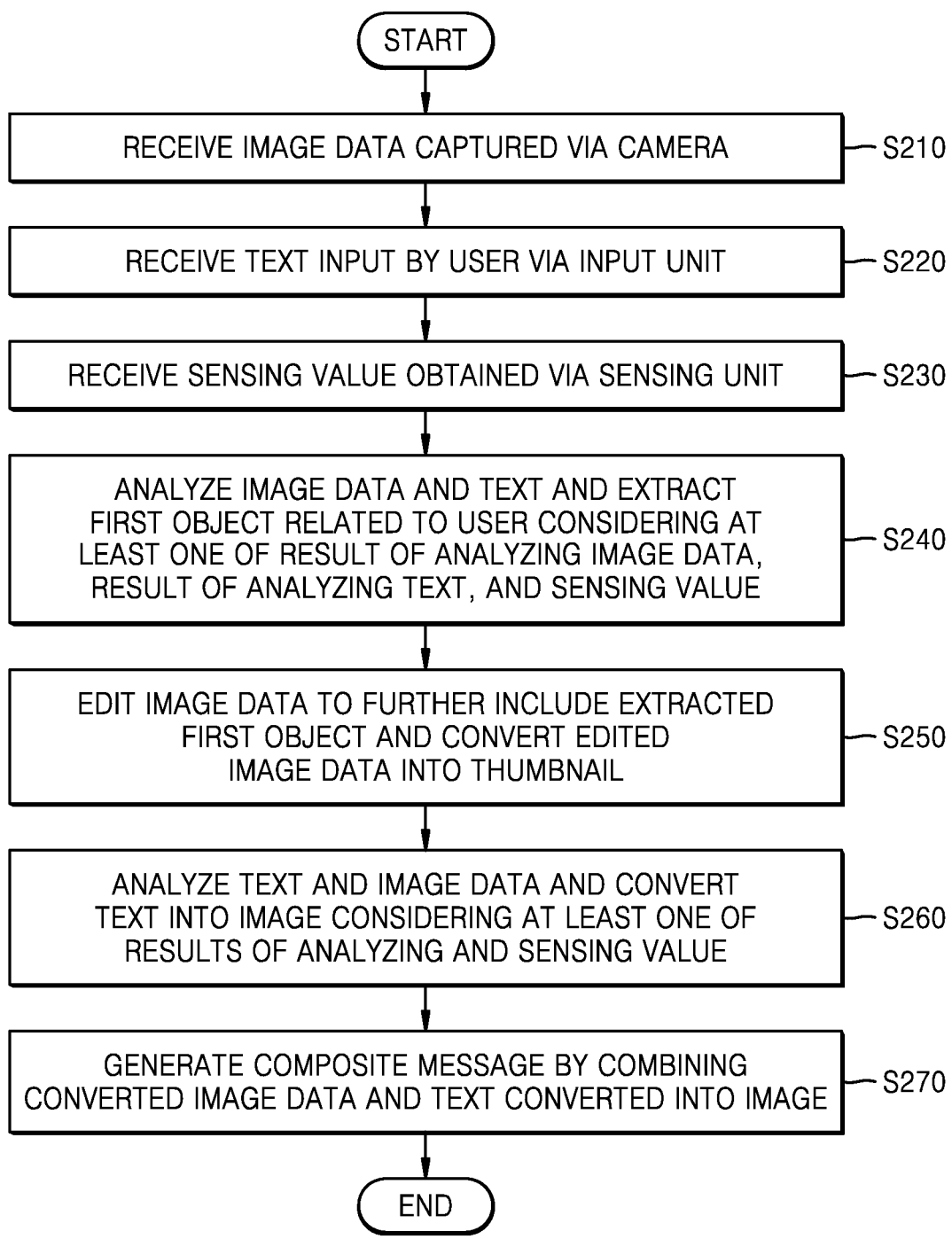

MESSAGE SHARING METHOD FOR SHARING IMAGE DATA REFLECTING STATUS OF EACH USER VIA CHAT ROOM AND COMPUTER PROGRAM FOR EXECUTING SAME METHOD

CROSS-REFERENCE TO RELATED APPLICATIONS

This application is a continuation application under 35 U.S.C. § 365(c) of PCT International Application No. PCT/KR2016/009218, which has an International filing date of Aug. 22, 2016, the content of which is hereby incorporated by reference in its entirety.

TECHNICAL FIELD

One or more example embodiments of the present disclosure relate to a message sharing method of sharing image data reflecting a status of each user via a chat room, and/or a system, apparatus, and/or a non-transitory computer readable medium having a computer program stored thereon for executing the message sharing method.

BACKGROUND

A chat system is a system in which users chat with each other by exchanging images and messages using their terminals. In general, a plurality of users post text or image data input through respective user terminals in the chat room to share the text and image data.

SUMMARY

Provided are a message sharing method, a message sharing apparatus, a message sharing system, and/or a non-transitory computer readable medium having a computer program stored thereon, in which objects related to emotions, positions, or surroundings of a user are extracted considering text input by the user, image data captured by a camera, etc., and image data where the objects are suitably combined is generated.

Also, provided are a message sharing method, a message sharing apparatus, a message sharing system, and/or a non-transitory computer readable medium having a computer program stored thereon, in which the generated image data and the text are controlled to be shared via a chat room.

According to an aspect of at least one example embodiment of the present disclosure, a computer program may be stored in a non-transitory computer readable medium to execute any one of message sharing methods according to at least one example embodiment of the present disclosure.

In addition, other methods, other systems, and non-transitory computer-readable recording media having recorded thereon computer programs for executing the methods for implementing the present disclosure are further provided.

Aspects, features, and merits other than those described above will become apparent from the attached drawings, claims, and detailed description.

A message sharing method, apparatus, system, and/or non-transitory computer readable medium including a computer program according to at least one example embodiment of the present disclosure can extract objects related to emotions, positions, or surroundings of a user considering text input by the user, image data captured by a camera, etc, and generate image data where the objects are suitably combined.

Also, the message sharing method and computer program according to at least one example embodiment of the present disclosure can control a composite message to be shared via a chat room.

BRIEF DESCRIPTION OF THE DRAWINGS

FIGS. 9 and 10 are flowcharts of message sharing methods according to at least one example embodiment of the present disclosure.

DETAILED DESCRIPTION

Figure 1:
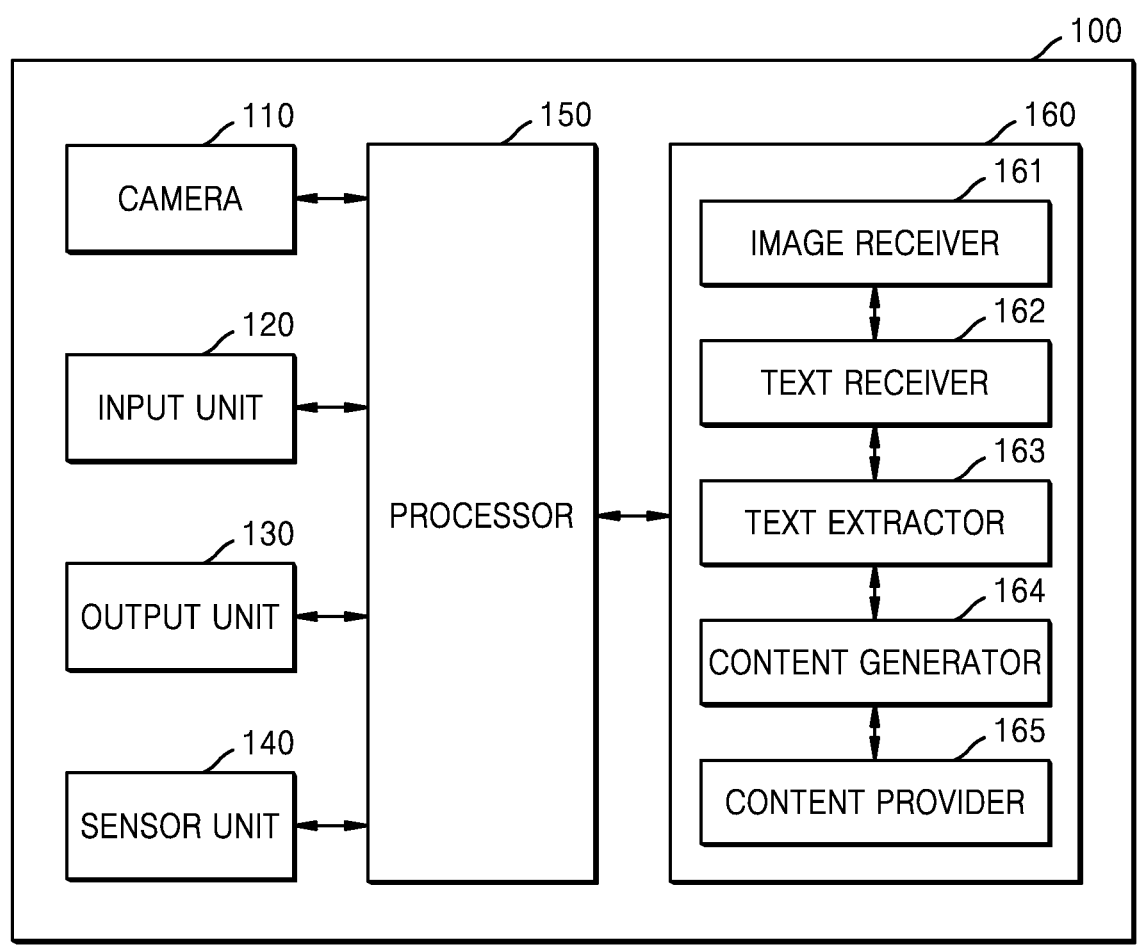
FIG. 1 is a block diagram showing a structure of a user terminal, according to at least one example embodiment of the present disclosure.

As the disclosure allows for various changes and numerous example embodiments, particular example embodiments will be illustrated in the drawings and described in detail in the written description. Advantages and features of the example embodiments of the present disclosure and methods of accomplishing the same may be understood more readily by reference to the following detailed description of the example embodiments and the accompanying drawings. In this regard, the present example embodiments may have different forms and should not be construed as being limited to the descriptions set forth herein.

Hereinafter, various example embodiments of the present disclosure will be described with reference to accompanying drawings. Those components that are the same or are in correspondence are rendered the same reference numeral regardless of the figure number, and redundant explanations are omitted.

While such terms as "first", "second", etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that terms such as "including" or "having," etc., are intended to indicate the existence of features or components, and are not intended to preclude the possibility that one or more other features or components may exist or may be added.

When a certain example embodiment may be implemented differently, a specific process order may be performed differently from the described order. For example, two consecutively described processes may be performed substantially at the same time or performed in an order opposite to the described order.

In the present specification, "circuit" may include, for example, a hardwired circuit storing an instruction executed by a programmable circuit, a programmable circuit, a state machine circuit, and/or firmware independently or in an arbitrary combination. An application may be implemented as code, computer readable instructions, and/or instruction executable on a programmable circuit, such as a host processor or another programmable circuit. A module used in an arbitrary example embodiments of the present disclosure may be implemented as a circuit. A circuit may be implemented as an integrated circuit, such as an integrated circuit chip.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or embodied by combining hardware and software.

FIG. 1 is a block diagram showing a structure of a user terminal 100, according to at least one example embodiment of the present disclosure.

Referring to FIG. 1, the user terminal 100 according to at least one example embodiment of the present disclosure may include a camera 110, an input unit 120, an output unit 130, a sensor unit 140, a processor 150, and/or a storage medium 160, etc., but the example embodiments are not limited thereto.

The camera 110 may obtain an image frame of a still image or a moving image via an image sensor in a video call mode or photographing mode. An image captured via the image sensor may be processed by the processor 150 or a separate image processor (not shown). The image frame processed by the camera 110 may be stored in the storage media 160 or externally transmitted. Two or more cameras 110 may be provided based on a configuration of a terminal.

The camera 110 may further include a microphone that receives an external sound signal and processes the external sound signal to electric voice data. The microphone may use various noise removing algorithms for removing noise generated while the external sound signal is received.

The input unit 120 denotes a unit into which a user inputs data for controlling the user terminal 100. For example, the input unit 120 may be a keypad, a dome switch, a touch pad (contact capacitance type, a pressure resistive film type, an infrared detection type, a surface ultrasonic wave conductive type, an integral tension measuring type, a piezo-effect type, or the like), a jog wheel, a jog switch, or the like, but is not limited thereto.

The output unit 130 outputs information processed or generated by the user terminal 100. For example, the output unit 130 may output a user interface (UI) provided when a game application is executed. Meanwhile, the output unit 130 may also be used as an input device in combination with the output device (e.g., an input/output (I/O) device), for example, when the output unit 130 and a touch pad form a layer structure to be configured as a touch screen, etc. The output unit 130 may include at least one of a liquid crystal display, a thin-film transistor-liquid crystal display, an organic light-emitting diode, a flexible display, a 3-dimensional (3D) display), an electrophoretic display, etc. Also, according to a configuration of the user terminal 100, the user terminal 100 may include two or more display units. In this case, the two or more display units 131 may be provided to face each other by using a hinge.

The sensor unit 140 may include a global positioning system (GPS) sensor calculating a geographical position of the user terminal 100 by using satellite communication.

The processor 150 generally controls overall operations of the user terminal 100. For example, the processor 150 may control, in overall, the camera 110, the input unit 120, the output unit 130, and the sensor unit 140 via instructions stored in the storage media 160. The processor 150 may include any type of devices capable of processing data, such as at least one processor. Here, a 'processor' may be understood as, for example, a data processing device included in hardware and including a circuit physically configured to perform a function expressed using computer programs, code, and/or computer readable instructions included in a special purpose program, thereby transforming the processor into a special purpose processor. Examples of the data processing device included in hardware may include various processing devices such as a microprocessor, a central processing unit (CPU), a processor core, a multiprocessor, an application-specific integrated circuit (ASIC), a field programmable gate array (FPGA), etc., but the example embodiments are not limited thereto.

The storage media 160 may store various types of data and software used during operation of the user terminal 100, such as an operating system, an application, a program, a library, and/or a driver, etc. The storage media 160 may include at least one type of storage medium from among a flash memory, a hard disk, a multimedia card micro, a card type memory (for example, a security digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the user terminal 100 may operate web storage or cloud server performing a storing function of the storage media 160 on the Internet.

Programs stored in the storage media 160 may be classified into a plurality of modules based on functions, and for example, may be classified into a UI module, a touch screen module, a notification module, etc.

Next, components stored in the storage media 160 will now be described in detail.

An image receiver 161 receives image data generated via the camera 110. The image receiver 161 captures image data for a pre-set period of time based on a point of time when transmission is input through the input unit 120.

A text receiver 162 receives text input through the input unit 120.

An object extractor 163 analyzes the image data and the text and may extract an object related to the user by using at least one of a result of analyzing the text, a result of analyzing the image data, and a sensing value obtained from the sensor unit 140. Here, an object denotes sensory data, such as visual data, auditory data, or the like, and may further include an effect of changing a basic image, such as an animation effect or the like. The text extractor 163 may extract a first object related to the user by using the result of analyzing the text. In detail, text input by a user may be analyzed via a method of processing the text in a natural language and an object related to the user may be extracted by using a result of analyzing the text. In detail, the text extractor 163 may separate the text input by the user in morpheme units, extract an adjective indicating an emotion of the user, and extract an object related to the emotion of the user based on the extracted adjective. For example, when the text input by the user includes an adjective 'sad', the text extractor 163 may extract an image corresponding to the sadness of the user as the object. Also, the text extractor 163 may separate the text in morpheme units, extract a verb corresponding to a current behavior of the user among the text, and extract an object related to the current behavior of the user based on the extracted verb. For example, when the text input by the user includes a verb 'watch a movie', the text extractor 163 may extract a theatre image as an object related to the behavior of the user. The text extractor 163 may separate the text input by the user in morpheme units, extract an adverb indicating a position of the user from the text, and extract an object related to the position of the user based on the adverb.

The text extractor 163 may analyze the image data captured via the camera 110 and extract the object related to the user by using the result of the analysis of the image data. In detail, the text extractor 163 may determine, as an analysis region, a region corresponding to the user existing in the image data currently captured via the camera 110, extract an edge, a feature point, or the like, included in the analysis region, determine a facial expression of a person included in the analysis region based on the edge, the feature point, or the like, and extract an object corresponding to the facial expression. For example, when the image data captured via the camera 110 includes a person with an angry expression, the text extractor 163 may extract an image corresponding to 'anger' as the object from the image data.

The text extractor 163 may determine, as an analysis region, a region corresponding to the user existing in the image data currently captured via the camera 110, extract an edge, a feature point, or the like, included in the analysis region, and extract additional text from the image data by analyzing lips of the user included in the analysis region based on the edge, the feature point, or the like. The text extractor 163 may generate an image corresponding to the additional text as a second object.

According to at least one other example embodiment, the text extractor 163 may extract a facial region corresponding to a human face included in the image data by using a facial recognition algorithm and position a first object or a second object related to the user according to the facial region.

The text extractor 163 may extract the object related to the user considering a position of the user obtained via the sensor unit 140. For example, when the position of the user obtained via the sensor unit 140 is 'Paris', the text extractor 163 may extract Eiffel tower or the like that is a representative architecture corresponding to 'Paris' as the object related to the user. Here, the text extractor 163 may extract, as the object related to the user, a representative architecture, a position itself, a background of surroundings, or the like corresponding to the position of the user.

The text extractor 163 may extract the object related to the user considering weather information obtained via the sensor unit 140 or another application (a search application, a portal application, a weather notification application, or the like) installed in the user terminal 100. For example, when the current weather is 'cloudy', the text extractor 163 may extract an image, such as cloud, grey sky, or the like, corresponding to 'cloudy' as the object.

According to at least one other example embodiment, the text extractor 163 may determine a season of a current time by using date and time information and extract an image according to the season as the object. Here, the date and time information may be obtained via a base station, obtained via the Internet, or measured based on information input by the user. The text extractor 163 may extract, as the object, an image of sprouts based on spring, an image of beach, swimsuits, or the like based on summer, an image of autumn leaves based on autumn, and an image of snow or snowman based on winter.

According to at least one other example embodiment, the text extractor 163 may determine a period of a current time by using date and time information and extract an image according to the period as the object. When the current time is a Christmas season, the text extractor 163 may extract, as the object, an image of a Christmas tree, Santa, or the like corresponding to Christmas. When the current time is "Jungbok," e.g., one of the hottest days of the year, the text extractor 163 may extract, as the object, an image of "samgyetang," "air conditioner," "swimming," "beach," or the like, e.g., objects corresponding to a "Jungbok" season.

The object extracted via the text extractor 163 may be a 2-dimensional (2D) data or 3D data changing according to time. Here, according to at least one other example embodiment, the text extractor 163 may add an animation effect to the extracted object. Regarding a fan, the text extractor 163 may add an animation effect of fan wings rotating. To express a sad person, the text extractor 163 may add an effect of tears, or to express a rainy day, the text extractor 163 may add an amination effect of rain. To express fireworks, the text extractor 163 may add an effect of fireworks gradually increasing.

A content generator 164 may edit the image data to further include the extracted object. In detail, the content generator 164 may determine a display position of each object such that the extracted object is suitably expressed. Regarding a bashful image, an angry image, or the like, that needs to be suitably displayed on a human face, the content generator 164 may determine the position of the extracted object considering the human face on the image data. Also, the content generator 164 may edit the image data such that the extracted object is displayed on a background of the image data. For example, the content generator 164 may add the text obtained from the image data to the image data and change the image data such that the text gushes out from the mouth. The content generator 164 may position an extracted 'angry' image on the top of the head. The content generator 164 may change the image data such that an extracted 'tear' image flows from the eyes.

Also, the content generator 164 may convert the image data into a thumbnail. Here, the content generator 164 may convert the image data into a thumbnail according to a profile format of the user. The content generator 164 may convert the size (resolution) of the image data or delete a part of the image data based on the profile format. In addition, the content generator 164 may reduce the capacity of the image data by reducing the resolution of the image data based on the profile format. Here, a profile is user-related information displayed together with a message provided in a chatroom.

The content generator 164 may generate a composite message in which the converted image data and the text are combined. Here, also regarding the text, the content generator 164 may analyze the image data and the text and change the text to an image considering at least one of the result of analyzing the image data, the result of analyzing the text, and the sensing value. The content generator 164 may change a font type, a font size, or a font color of the text, or may display the text like an image. In other words, the content generator 164 may generate the composite message in which the converted image data and the text converted into the image are combined. The content generator 164 may provide not only the text input by the user, but also generate a composite message in which currently captured image data including an object reflecting an emotion or position of the user, or current weather, season, period, or the like is combined. Accordingly, the user terminal 100 according to at least one example embodiment of the present disclosure may provide a composite message in which information, such as an emotion or position of the user, weather, or the like, is visualized, and subordinate information related to the user may be obtained without having to recognize the text.

According to at least one other example embodiment, the content generator 164 may change the font, the font size, the color, or the like expressing the text while providing the text. With respect to one piece of text, the content generator 164 may distinguish and display morphemes included in the text via different fonts, different font sizes, and different colors. Also, the content generator 164 may also express the text in 2D or provide the text with an animation effect in which the text is generated from the mouth of a person in the image data. For example, an animation effect of providing text may be an effect in which text flies from the left or right, an effect in which text flies from top or bottom, or the like.

A content provider 165 may provide the converted image data and the text to be shared with another user via a chatroom. The content provider 165 provides the generated composite message to be shared with the other user via the chatroom. The content provider 165 provides the composite message via the chatroom in which a plurality of users exchange messages. The size of composite message may vary based on input image data, text, or an extracted object. According to at least one other example embodiment, the content provider 165 may provide an animation effect included in the composite message only for a desired and/or pre-set basic period of time, for example, only for 15 minutes, after the animation effect is first provided, and provide the composite message in 2D without the animation effect included in the composite message after 15 minutes.

According to at least one other example embodiment, the generated composite message may be set as a profile photograph of each user, and in detail, may function as a temporary profile only in a corresponding chatroom.

The user terminal 100 according to at least one example embodiment of the present disclosure may further visually express an emotion, feeling, condition, or the like to be transmitted by a user by extracting an object from input text or image data. Also, the user terminal 100 according to at least one example embodiment of the present disclosure may receive, from a user, a selection on an object to be added to image data shared via a chatroom. The user terminal 100 according to at least one example embodiment of the present disclosure may share, via a chatroom, data other than text unlike a general chat system, and in particular, may convert and provide pieces of data corresponding to a plurality of input data types in one piece of content. For example, in response to 'I love you' input by a user, the user terminal 100 may select an object that maximizes the feeling of 'I love you' from a plurality of pre-stored icons. The user terminal 100 may generate one piece of data by time-serially arranging messages shared in a chatroom by reflecting an extracted object, and provide another status (position, time, weather, emotion, or the like) at a point of time when each message is input, through a composite message or an object added to image data even after a long time has lapsed from the point of time when each message is input. In other words, the user terminal 100 may further provide a position of each user, weather when each message is input, a time when each message is input, or the like via the object or composite message.

Figure 2:
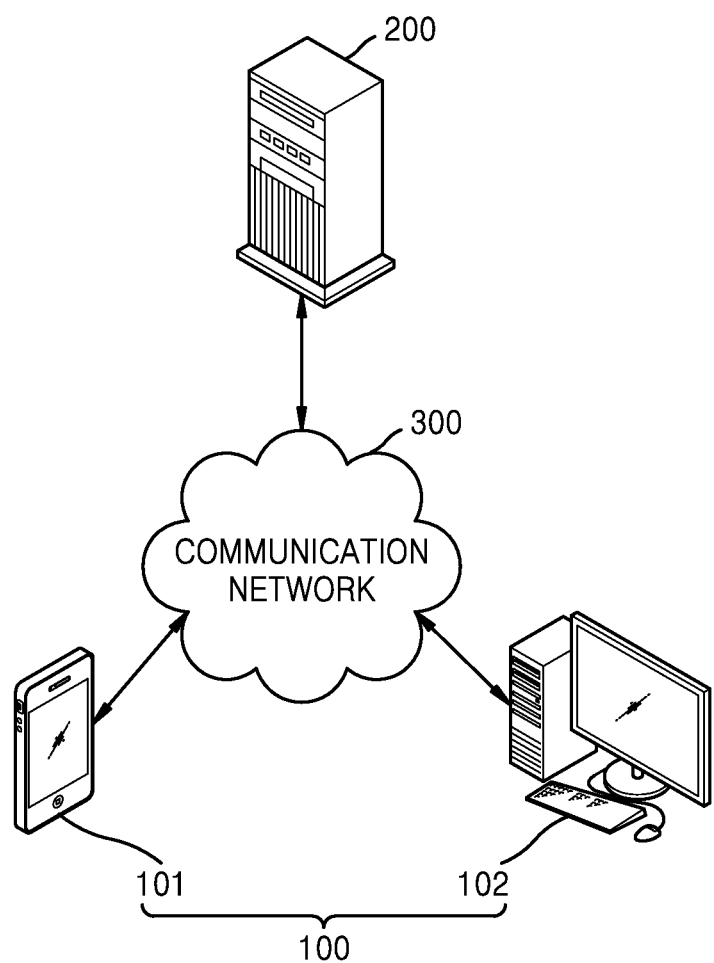
FIG. 2 is a diagram showing a structure of a chat system, according to embodiments of the present disclosure.

FIG. 2 is a diagram showing a structure of a chat system, according to at least one example embodiment of the present disclosure.

A user may access a chat server 200 through the user terminals 100. The user terminals 100 may download a chat application provided by the chat server 200. Also, the user terminal 100 may transmit use information of at least one other application mounted thereon to the chat server 200.

The plurality of user terminals 100 denote communication terminals capable of using a web service in a wired and/or wireless communication environment. Here, the user terminals 100 include a personal computer 101 of a user or a mobile terminal 102 of the user. In FIG. 2, the mobile terminal 102 is illustrated as a smart phone, but the example embodiments are not limited thereto and a terminal on which an application capable of web browsing as described above is mounted may be unlimitedly employed.

In detail, the user terminal 100 may include a computer (for example, a desktop computer, a laptop computer, a tablet computer, or the like), a media computing platform (for example, a cable, a satellite setup box, a digital video recorder, or the like), a handheld computing device (for example, a personal digital assistant (PDA), an email client, or the like), an arbitrary type of mobile phone, or an arbitrary type of computing or communication platform, but the example embodiments are not limited thereto.

The chat server 200 may provide a general chat service. The chat server 200 may create or remove a chat room based on a request received from a user. The chat server 200 may receive a composite message generated by a first user terminal and provide the composite message to another user terminal in the chat room.

Meanwhile, a communication network 300 performs a function of connecting the plurality of user terminals 100 to the chat server 200. In other words, the communication network 300 denotes a communication network providing an access path for the user terminals 100 to access the chat server 200 and transmit or receive data. Examples of the communication network 300 include wired networks, such as local area network (LAN), wide area network (WAN), metropolitan area network (MAN), and integrated service digital network (ISDN), and wireless networks, such as wireless LAN, CDMA, Bluetooth, and satellite communication, but are not limited thereto.

Figure 3:
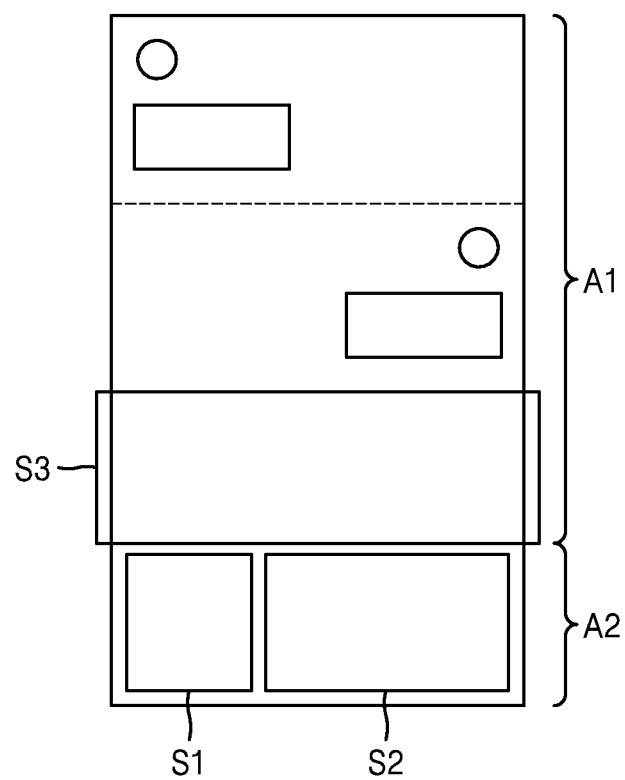
FIG. 3 is a diagram for describing a user interface of a chat room provided to a user terminal according to at least one example embodiment.

FIG. 3 is a diagram for describing a UI of a chatroom provided to a user terminal according to at least one example embodiment.

The UI of the chatroom provided to the user terminal may include a first region A1 providing messages exchanged via the chatroom and a second region A2 pre-providing text and image data obtained through the user terminal.

In the first region A1, messages are generally arranged in a chronological order, and when a new message is input, the new message is added at the bottom and thus the top message may disappear from a display area. The first region A1 may provide profile information of a user who input a message, together with the message. In particular, the user terminal 100 according to at least one example embodiment of the present disclosure may display, instead of the profile information of the user, image data S1 captured via a camera on a part of the second region A2. Also, the user terminal 100 according to at least one example embodiment of the present disclosure may display text S2 input by the user in the remaining region of the second region S2. Upon receiving an input for transmitting text and image data input by the user, the text and the image data including an extracted object may be provided in a lowermost region S3 of the first region A1, as a separate region. According to at least one other example embodiment, a composite message in which the text input by the user and the image data including the extracted object are combined may be provided on the lowermost region S3 of the first region A1. In the lowermost region S3 where a message is displayed, one message in which image data, text, and an object extracted through the image data and text are combined may be provided in one region without distinguishing the regions displaying the image data and the text. In the lowermost region S3 where a message is displayed, image data and text may be provided in separate regions.

Accordingly, in a message sharing method according to at least one example embodiment of the present disclosure, a region provided as a chatroom may be entirely expressed in data input by a user. Also, by further providing image data obtained by capturing an image of a user who is an interlocutor according to at least one example embodiment of the present disclosure, a sender of each message may be further easily identified.

FIGS. 4 through 8 are diagrams for describing examples of converted image data and generated composite messages according to a message sharing method according to some example embodiments.

As shown in FIGS. 4 through 8, input text may be included in a speech bubble connected to a person included in image data.

Figure 4:
FIGS. 4 through 8 are diagrams for describing examples of converted image data and generated composite messages according to a message sharing method according to some example embodiments.
Figure 4:
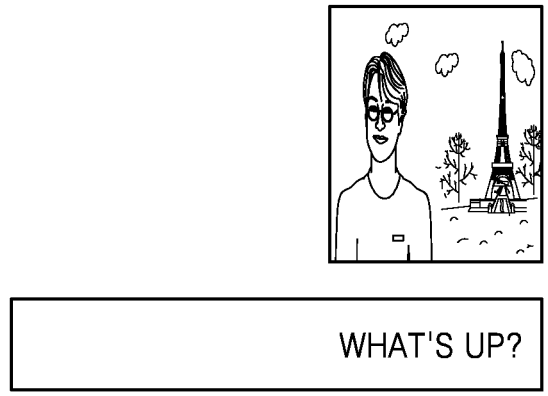
Figure 4:

FIG. 4 illustrates an example in which an object is extracted based on position information of a user terminal and image data or composite message including the object is generated according to at least one example embodiment. When the position of the user terminal is 'Paris', image data may be converted as shown in FIG. 4 (B) to include Eiffel tower that is a representative image of 'Paris' as a background such that 'Paris' that is the position of the user is further easily recognized. When the position of the user terminal is 'Paris', a composite message including Eiffel tower that is the representative image of 'Paris' as a background may be generated as shown in FIG. 4 (C) such that 'Paris' that is the position of the user is further easily recognized. In particular, when an extracted position of the user is a place where the user does not often visit normally or is a country different from a position of another user in a chatroom, an object may be extracted based on position information of the user terminal. The extracted object is expressed together with image data captured at a current point of time. Also, the composite message may be provided together by converting text into an image. As shown in FIG. 4 (C), the composite message further includes the text in a speech bubble.

Figure 5:
Figure 5:
Figure 5:

FIG. 5 illustrates an example in which an object is extracted based on weather information determined by a user terminal and image data or composite message including the object is generated according to at least one example embodiment. When the weather information found based on a position of the user terminal and a current time is 'rain', image data including a 'raining background' may be generated as shown in FIG. 5 (B) such that obtained weather is further easily recognized. When the weather information found based on the position of the user terminal and the current time is 'rain, a composite message including the 'raining background' may be generated as shown in FIG. 5 (C) such that the obtained weather is further easily recognized.

Figure 6:
Figure 6:
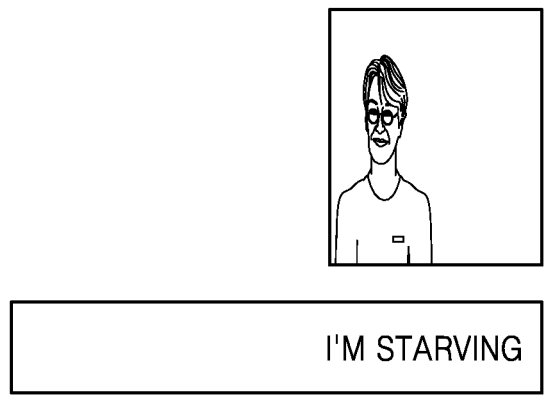
Figure 6:

FIG. 6 illustrates an example in which a composite message including an object related to an emotion of a user extracted from text input by the user is generated according to at least one example embodiment. Image data or composite message may be generated by reflecting 'I'm starving" input by the user. In detail, based on text "I'm starving' input by the user as shown in FIG. 6 (B), a human face included in captured image data may additionally include an image or emoji indicating hunger.

Figure 7:
Figure 7:
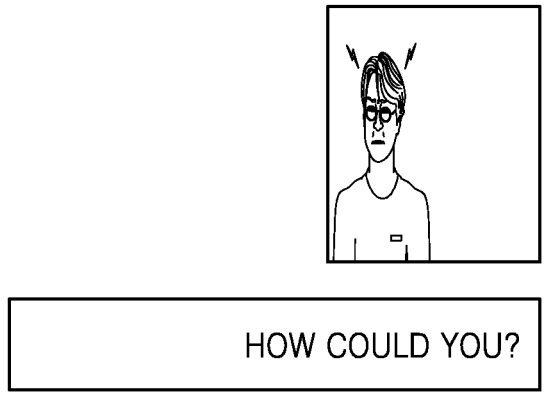
Figure 7:
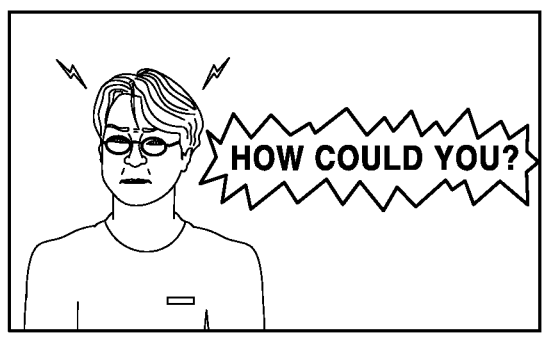

FIG. 7 illustrates an example in which image data or composite message including an object related to an emotion of a user extracted from text or image data input by the user is generated according to at least one example embodiment. In other words, the user terminal 100 may analyze text "how could you?" input by the user and determine an emotion of the user to be 'anger' based on context of the text. The image data or composite message may include an image corresponding to 'anger' on a shape of a person of the image data, based on the determined emotion of the user. Also, the composite message may change a display method of the input text. In other words, letters of the text may be changed to be larger and thicker, and a shape of speech bubble may be changed as shown in FIG. 7 (C) based on the emotion of the user. The shape of speech bubble may be jagged based on or correspond to the 'anger' emotion of the user. In summary, a message sharing method according to at least one example embodiment of the present disclosure may add an image expressing an emotion of a user, change of a font corresponding to the emotion, and reflect a subordinate animation effect, relation to the emotion of the user obtained via text or image data.

Figure 8:
Figure 8:
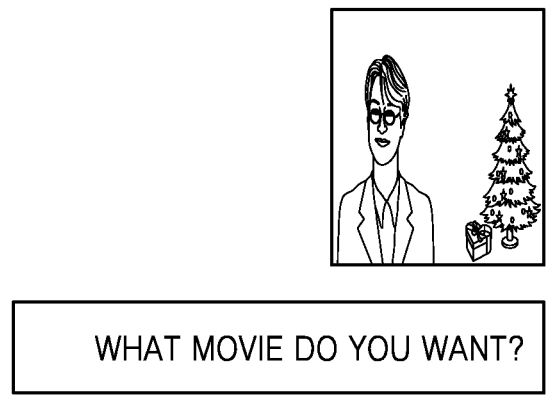
Figure 8:

FIG. 8 illustrates an example in which image data or composite message including an object extracted considering season information obtained via time information and text input by a user is generated according to at least one example embodiment. As shown in FIG. 8, when a period corresponding to the time information is Christmas, the image data or composite message may further include a tree image related to the period, and a tuxedo that associate with Christmas may be overlapped additionally on an outfit of the user in the image data considering input text. In other words, when the input text is asking someone for a date, the outfit of the user may be changed to an appropriate tuxedo.

Figure 9:
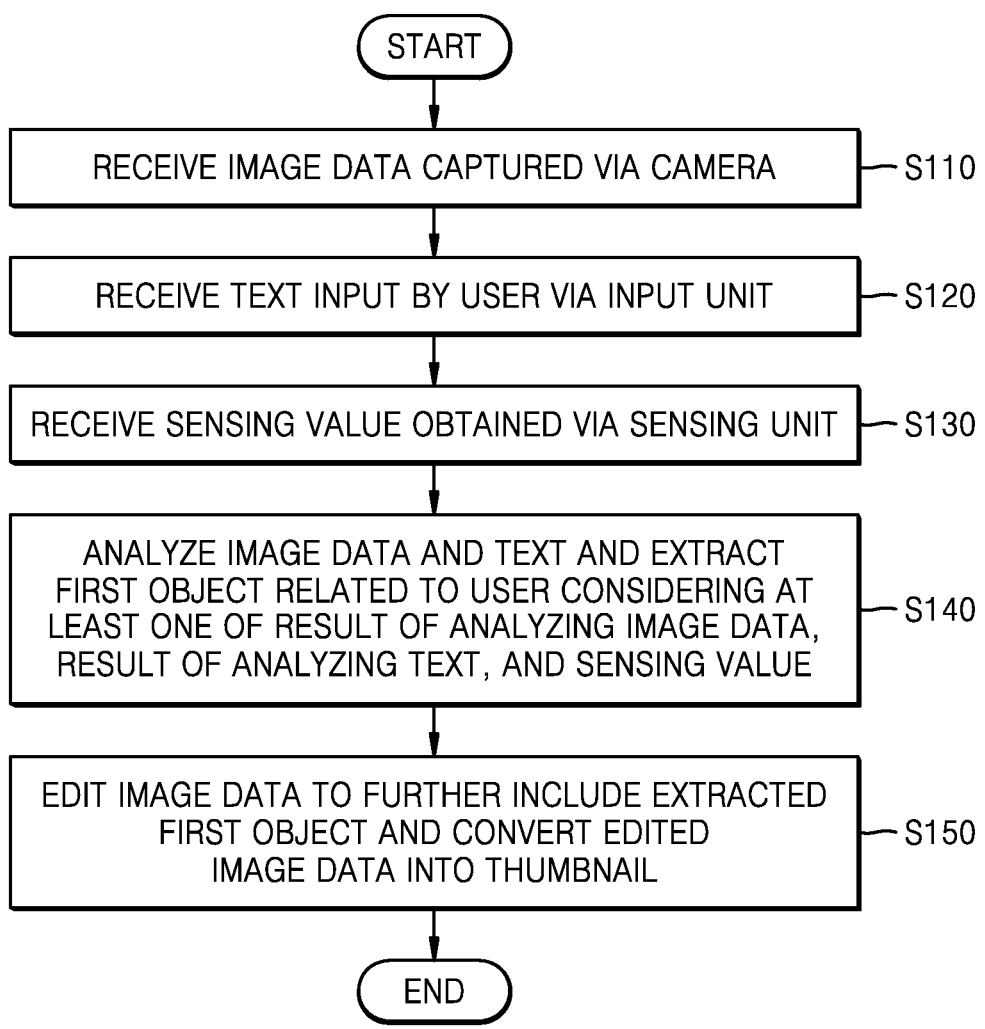

FIGS. 9 and 10 are flowcharts of message sharing methods according to some example embodiments of the present disclosure.

Referring to FIG. 9, the message sharing method according to at least one example embodiment of the present disclosure may include receiving image data (operation S110), receiving text (operation S120), receiving a sensing value (operation S130), extracting an object (operation S140), and editing the image data (operation S150).

In operation S110, the user terminal 110 receives image data captured via a camera. The image data is captured for a desired and/or pre-set period of time, for example, two seconds, according to an input of a user. In operation S120, the user terminal 100 receives text input via an input unit. In operation S130, the user terminal 100 may receive a sensing value, such as a position of the user, weather around the user, a time, or the like, via a sensor unit.

In operation S140, the user terminal 100 may analyze the text and the image data, and extract a first object related to the user by using at least one of a result of analyzing the text, a result of analyzing the image data, and the sensing value obtained from the sensor unit. Since operation S140 is the same as operations of the text extractor 163, details thereof are not provided again.

In operation S150, the user terminal 100 may edit the image data to further include the extracted first object. The user terminal 100 may determine a display position of each object such that the extracted first object is suitably expressed. The user terminal 100 may determine the position of the extracted first object considering a human face in the image data, in relation to a bashful image, an angry image, or the like, that needs to be suitably displayed on the human face. Also, the user terminal 100 may edit the image data such that the extracted first object is displayed on a background of the image data. The user terminal 100 edits the image data such that the first object is displayed on the determined position. Also, the user terminal 100 may convert the edited image data into a thumbnail. The thumbnail may be set as a profile of each user. The converting into the thumbnail denotes changing of a size of the edited image data, removing of a part of the image data, or reducing of capacity of the image data.

Referring to FIG. 10, the message sharing method according to at least one example embodiment of the present disclosure may include receiving image data (operation S210), receiving text (operation S220), receiving a sensing value (operation S230), extracting an object (operation S240), editing the image data (operation S250), and generating a composite message (operation S260).

In operation S210, the user terminal 110 receives image data captured via a camera. The image data is captured for a desired and/or pre-set period of time, for example, two seconds, according to an input of a user. In operation S220, the user terminal 100 receives text input via an input unit. In operation S230, the user terminal 100 may receive a sensing value, such as a position of the user, weather around the user, a time, or the like, via a sensor unit.

In operation S240, the user terminal 100 may analyze the text and the image data, and extract a first object related to the user by using at least one of a result of analyzing the text, a result of analyzing the image data, and the sensing value obtained from the sensor unit. Since operation S240 is the same as operations of the text extractor 163, details thereof are not provided again.

In operation S250, the user terminal 100 may edit the image data to further include the extracted first object. The user terminal 100 may determine a display position of each object such that the extracted first object is suitably expressed. The user terminal 100 may determine the position of the extracted first object considering a human face in the image data, in relation to a bashful image, an angry image, or the like, that needs to be suitably displayed on the human face. Also, the user terminal 100 may edit the image data such that the extracted first object is displayed on a background of the image data. The user terminal 100 edits the image data such that the first object is displayed on the determined position. Also, the user terminal 100 may convert the edited image data into a thumbnail.

In operation S260, the user terminal 100 may analyze the text and the image data, and convert the text into an image by using at least one of a result of analyzing the text, a result of analyzing the image data, and the sensing value obtained from the sensor unit.

In operation S270, the user terminal 100 may generate one composite message by using the converted image data and the text. The user terminal 100 may convert the text into an image, and in this case, the composite message may include the converted image data and the text converted into the image.

One or more of the above example embodiments may be embodied in the form of a computer program that can be run in a computer through various elements. The computer program may be recorded on a non-transitory computer-readable recording medium. Examples of the non-transitory computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, the computer program may be embodied on a formless medium that can be transmitted and distributed in a network, e.g., software or an application.

Meanwhile, the computer programs may be specially designed. Examples of the computer programs include mechanical code prepared by a compiler, and high-level languages executable by a computer by using an interpreter.

The particular implementations shown and described herein are illustrative examples of the example embodiments and are not intended to otherwise limit the scope of the example embodiments in any way. For the sake of brevity, conventional electronics, control systems, software development, and other functional aspects of the systems (and components of the individual operating components of the systems) may not be described in detail. Furthermore, the connecting lines or connectors shown in the various figures presented are intended to represent example functional relationships and/or physical or logical couplings between the various elements. It should be noted that many alternative or additional functional relationships, physical connections, or logical connections may be present in a practical device. Moreover, no item or component is essential to the practice of the example embodiments unless the element is specifically described as "essential" or "critical".

The use of the terms "a", "an", "the", and similar referents in the context of describing the example embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or example language (e.g., "such as") provided herein, is intended merely to better illuminate the disclosure and does not pose a limitation on the scope of the example embodiments unless otherwise claimed. Numerous modifications and adaptations will be readily apparent to those of ordinary skill in this art without departing from the spirit and scope of the example embodiments.

What is claimed is:

1. A non-transitory computer readable medium having computer readable instructions stored thereon, which when executed by at least one processor of a user device, cause the at least one processor to execute a message sharing method, wherein the message sharing method comprises:
   receiving image data captured via at least one camera of the user device;
   receiving text input by a first user via at least one input/output device of the user device;
   obtaining a sensed value from at least one sensor of the user device;
   analyzing the text and the image data, the analyzing the image data including determining a region corresponding to a shape of a person, the image data including an image of the person;
   extracting a first object related to the first user using the determined region corresponding to the shape of the person and at least one of a result of analyzing the text, a result of analyzing the image data, and the sensed value;
   editing the image data to further include the extracted first object;

converting the edited image data into a thumbnail image; and transmitting the thumbnail image and the text to a second user via a chat room.

2. The non-transitory computer readable medium of claim 1, wherein the extracting of the first object related to the first user comprises:

separating the text into morpheme units;

extracting an adjective indicating an emotion of the first user from the separated text; and extracting the first object related to the emotion of the first user based on the extracted adjective.

3. The non-transitory computer readable medium of claim 1, wherein the extracting of the first object related to the first user comprises:

determining an emotion of the first user based on the determined region corresponding to the shape of the person of the image data, the determining the emotion of the first user including determining a facial expression of the person included in the image data through an edge included in the determined region; and extracting the first object based on the determined emotion of the first user.

4. The non-transitory computer readable medium of claim 1, wherein the sensed value is a position value or a time value obtained by the at least one sensor; and the extracting of the first object related to the first user comprises extracting the first object corresponding to the sensed value.

5. The non-transitory computer readable medium of claim 1, wherein the extracting the first object related to the first user comprises extracting a human face included in the image data using a facial recognition algorithm; and the converting of the image data comprises, adding the extracted first object based on the extracted human face, and adjusting a size of the image data based on the extracted human face.

6. The non-transitory computer readable medium of claim 1, wherein the transmitting comprises:

changing the text, the changing including changing at least one of a font of the text, a size of the font, and a color of the text based on the first object; and transmitting the changed text to the second user via the chat room.

7. The non-transitory computer readable medium of claim 1, wherein the transmitting comprises:

generating a composite message based on the thumbnail image and the text; and transmitting the composite message to the second user via the chat room.

8. The non-transitory computer readable medium of claim 7, wherein the generating the composite message comprises:

converting the text to an image using at least one of the result of analyzing the text, the result of analyzing the image data, and the sensed value;

generating the composite message based on the converted text and the thumbnail image; and transmitting the composite message to the second user via the chat room.

9. The non-transitory computer readable medium of claim 1, wherein the analyzing the image data includes analyzing the image data to identify lips included in the image data;

the extracting the first object includes extracting text as a second object, the text extracted based on the identified lips included in the image data;

the converting the image data to the thumbnail image includes changing the thumbnail image to include the second object; and transmitting the thumbnail image to the second user via the chat room.

10. The non-transitory computer readable medium of claim 1, wherein the thumbnail image is registered as profile information of the first user.

11. A message sharing method of a computer comprising:

receiving, using at least one processor of the computer, image data captured via at least one camera of the computer;

receiving, using the at least one processor, text input by a first user via at least one input/output device of the computer;

obtaining, using the at least one processor, a sensed value from at least one sensor of the computer;

analyzing, using the at least one processor, the text and the image data, the analyzing the image data including determining a region corresponding to a shape of a person, the image data including an image of the person;

extracting a first object related to the first user using the determined region corresponding to the shape of the person and at least one of a result of analyzing the text, a result of analyzing the image data, and the sensed value;

editing, using the at least one processor, the image data to further include the extracted first object;

converting the edited image data into a thumbnail image; and transmitting, using the at least one processor, the thumbnail image and the text to a second user via a chat room.

12. The message sharing method of claim 11, wherein the extracting of the first object related to the first user comprises:

separating the text into morpheme units;

extracting an adjective indicating an emotion of the first user from the separated text; and extracting the first object related to the emotion of the first user based on the extracted adjective.

13. The message sharing method of claim 11, wherein the extracting of the first object related to the first user comprises:

determining an emotion of the first user based on the determined region corresponding to the shape of the person of the image data, the determining the emotion of the first user including determining a facial expression of the person included in the image data through an edge included in the region; and extracting the first object based on the determined emotion of the first user.

14. The message sharing method of claim 11, wherein the sensed value is a position value or a time value obtained by the at least one sensor; and the extracting of the first object related to the first user comprises extracting the first object corresponding to the sensed value.

15. The message sharing method of claim 11, wherein the extracting the first object related to the first user comprises extracting a human face included in the image data using a facial recognition algorithm; and the converting of the image data comprises, adding the extracted first object based on the extracted human face, and adjusting a size of the image data based on the extracted human face.

16. The message sharing method of claim 11, wherein the transmitting comprises:

changing the text, the changing including changing at least one of a font of the text, a size of the font, and a color of the text based on first object; and transmitting the changed text to the second user via the chat room.

17. The message sharing method of claim 11, wherein the transmitting comprises:

generating a composite message based on the thumbnail image and the text; and transmitting the composite message to the second user via the chat room.

18. The message sharing method of claim 17, wherein the generating the composite message comprises:

converting the text to an image using at least one of the result of analyzing the text, the result of analyzing the image data, and the sensed value;

generating the composite message based on the converted text and the thumbnail image; and transmitting the composite message to the second user via the chat room.

19. The message sharing method of claim 11, wherein the analyzing the image data includes analyzing the image data to identify lips included in the image data;

the extracting the first object includes extracting text as a second object, the text extracted based on the identified lips included in the image data;

the converting the image data to the thumbnail image includes changing the thumbnail image to include the second object; and transmitting the thumbnail to the second user via the chat room.

20. The message sharing method of claim 11, wherein the thumbnail image is registered as profile information of the first user.

* * * * *